US007629068B2

(12) United States Patent
Hoffjann et al.

(10) Patent No.: US 7,629,068 B2
(45) Date of Patent: Dec. 8, 2009

(54) AIRCRAFT HAVING INTEGRATED ELECTROCHEMICAL SUPPLY SYSTEM

(75) Inventors: Claus Hoffjann, Neu Wulmstorf (DE); Hans-Georg Schuldzig, Jork (DE); Harald Gruendel, Hamburg (DE); Hans-Juergen Heinrich, Hamburg (DE)

(73) Assignee: Airbus Deutschland GmbH (DE)

( * ) Notice: Subject to any disclaimer, the term of this patent is extended or adjusted under 35 U.S.C. 154(b) by 141 days.

(21) Appl. No.: 11/137,231

(22) Filed: May 25, 2005

(65) Prior Publication Data

US 2006/0054740 A1    Mar. 16, 2006

Related U.S. Application Data

(60) Provisional application No. 60/598,456, filed on Aug. 3, 2004.

(30) Foreign Application Priority Data

May 28, 2004  (DE) .................... 10 2004 026 226

(51) Int. Cl.
    *H01M 8/18* (2006.01)
(52) U.S. Cl. ..................... 429/26; 244/118.5
(58) Field of Classification Search ............. 244/118.5; 429/34, 19, 13, 26
    See application file for complete search history.

(56) References Cited

U.S. PATENT DOCUMENTS

| 4,314,984 | A | * | 2/1982 | Frosch et al. ............... 423/579 |
| 4,332,650 | A | * | 6/1982 | Foh et al. ................... 205/338 |
| 4,445,990 | A | * | 5/1984 | Kim et al. ................... 588/303 |
| 5,074,975 | A | * | 12/1991 | Oloman et al. ............. 205/465 |
| 5,207,877 | A | * | 5/1993 | Weinberg et al. ........... 423/210 |
| 5,372,710 | A | * | 12/1994 | Frank ......................... 210/117 |
| 5,705,051 | A | * | 1/1998 | Coin et al. .................. 205/770 |
| 6,834,831 | B2 | * | 12/2004 | Daggett ...................... 244/58 |
| 2002/0058175 | A1 | | 5/2002 | Ruhl |
| 2003/0207164 | A1 | | 11/2003 | McElroy et al. |
| 2004/0043276 | A1 | | 3/2004 | Hoffjann et al. |
| 2004/0058230 | A1 | * | 3/2004 | Hsu .............................. 429/62 |
| 2004/0137290 | A1 | * | 7/2004 | Woods et al. ................. 429/21 |

FOREIGN PATENT DOCUMENTS

| DE | 102 16 361 A1 | 4/2003 |
| DE | 102 29 309 | 1/2004 |
| EP | 1 357 625 | 10/2003 |

* cited by examiner

*Primary Examiner*—Tien Dinh
(74) *Attorney, Agent, or Firm*—Lerner, David, Littenberg, Krumholz & Mentlik, LLP

(57) ABSTRACT

An aircraft includes a supply system with an electrochemical reactor for generating energy, hydrogen, oxygen and clear water from grey water, a hydrocarbon containing fuel and air, so that the up to now separated systems for supply of clear water, generation of energy and generation of oxygen are combined to a combined system. The necessary redundancies may thereby secured by two or more systems of the same kind, which may be operated completely independently of each other.

14 Claims, 2 Drawing Sheets

US 7,629,068 B2

AIRCRAFT HAVING INTEGRATED ELECTROCHEMICAL SUPPLY SYSTEM

CROSS-REFERENCE TO RELATED APPLICATIONS

This application claims the benefit of the filing date of U.S. Provisional Patent Application No. 60/598,456 filed Aug. 3, 2004, the disclosure of which is hereby incorporated herein by reference.

BACKGROUND OF THE INVENTION

The present invention relates to an aircraft having an integrated electrochemical supply system. In particular, the present invention relates to an aircraft having a supply system comprising a first electrochemical reactor for generating energy, hydrogen, oxygen and clear water and to a supply system.

In aircrafts, the individual supply systems, as for example systems for generating energy, providing portable water and disposal of waste water, the air conditioner, as well as systems for emergency-related supply of oxygen to the passengers, are completely separated from each other. Especially, the raw materials or fuels necessary for the operation or the supply of the individual supply systems have been carried along in respective storing containers. These storing containers are filled before the flight.

The necessary carrying along of storing containers as for example clear water tanks or oxygen tanks, requires extensive need of space and leads to an increased flight weight. Further, the loading procedure requires a considerable degree of amount of time and it is usually necessary that respective special machines or special instruments be applied for loading.

SUMMARY OF THE INVENTION

According to an exemplary embodiment of the present invention, an aircraft is provided, comprising a first electrochemical reactor for creating energy, hydrogen, oxygen and clear water from grey water, a fuel containing hydrocarbon and water. The first electrochemical reactor thereby replaces or assists at least one of the systems of the aircraft selected from the group consisting of auxiliary power unit for generating pressurised air and electric energy, ram air turbine, clear water tank of a water system, power unit generator for generating electric energy and oxygen supply system.

Such supply system for aircrafts combines the up to now separated systems for clear water supply, generation of energy and generation of oxygen to a combined system. Such supply system may thereby advantageously generate electric energy, heat energy (which is for example subsequently used within the supply system itself) hydrogen, oxygen and clear water, whereby the carrying along of these resources may be reduced or may completely be omitted.

Preferably, the waste water created within the aircraft, subsequent to a respective clearing or demineralisation, may be supplied to the supply system again, whereafter it may be separated into the components hydrogen and oxygen in an electrochemical reactor. From the created hydrogen and oxygen which is generated, there may then be generated water, especially by means of the application of several electrochemical reactors. Thereby, the water cycle within the aircraft is closed.

According to a further exemplary embodiment of the present invention, the supply system further comprises a control unit for controlling or regulating the process occurring or running in the reactor, wherein the chemical or electrochemical processes taking place within the reactor happen or proceed as complete process and may not be separated from each other.

Thereby, by means of the connecting of the different chemical or electrochemical processes running within the reactor to a complete process, a closed supply system may be provided, wherein the internally running processes are connected with each other in such a way, that an improved exploitation of energy may be provided. In this way, for example, the process heat generated in a fuel cell process may be used for vaporising the fuel containing hydrocarbon supplied at the entrance side.

According to a further exemplary embodiment of the present invention, the supply system further comprises a second electrochemical reactor, wherein the control unit controls or regulates the first and second reactors individually, so that the first reactor and the second reactor may be operated independently of each other.

For example, the supply system consists of at least two reactors. Each reactor is controlled or regulated by an own control, which are combined to the control unit. Preferably, the controls communicate with each other, so that in case of a breakdown of one reactor, this one is replaced by the remaining reactors.

Preferably, a redundancy in the supply of the aircraft with energy, hydrogen, oxygen and clear water is ensured. In case of breakdown of a reactor, whether due to a defect or for example because of maintainance works, the other reactor takes its responsibilities. It is further possible to cover performance peaks which may occur during the flight operation by means of connecting several independent reactors.

According to a further exemplary embodiment of the present invention, the supply system further comprises a portable water using arrangement, especially at least one washing room installation, toilet flushing, excrements transport device or excrements collecting device, wherein the portable water using arrangement comprises a collecting device for collecting accumulating waste waters.

The waste waters accumulating in the portable water using arrangement may be collected, and after a respective pre-cleaning or demineralisation process may be supplied to the electrochemical reactor, for example for generating hydrogen, oxygen or clear water. The water cycle within the aircraft may be completely closed.

According to a further exemplary embodiment of the present invention, the first or second reactor is followed by at least one condensing unit for condensing-out water portions from an exhaust gas of the first or second reactor, i.e. a condensing unit may be arranged behind the reactors (in accordance with the flow direction of the substances).

By using a condensing unit from a high amount of the water contained in the exhausts of the reactors may removed these exhausts, which water may be supplied to the supply system anew.

According to a further exemplary embodiment of the present invention, the processes occurring in the first or second reactor may be regulated in such a way, that a combination of first and second reactor towards behaves in a thermally neutral way to the outside, so that a simple isolation of the combination may be sufficient for the installation into the aircraft or space vehicle.

The regulation of the thermal equilibrium is generally determined by constructive measures. The regulation parameters within the system are once adjusted and then follow parameters given from outside. Thus, usually there will be a thermal equilibrium within the system. The only exceptions are the warming-up phase and the settling down phase. During warming-up, heat has to be supplied (burner, electric heating) by means of a separate process. When settling down, the processes are simply interrupted. No further conversion of substance takes place, and the system cools off.

According to a further exemplary embodiment of the present invention, the supply system further comprises at least one turbine or at least one pump, wherein the at least one turbine or pump is adapted to transport an output material flow exiting from the first or second reactor or for pumping an input material flow supplied to the first or second reactor.

By means of the at least one pump or turbine, it may be possible to create a respective loading pressure of the input material flow, or to increase the flowing-in velocity of the input material flow, respectively, and thereby to adapt the actual demand of supply. Further, by means of the pump or turbine, the transporting-out velocity of respective output material flows may be regulated, or an increased pressure within the tubing system of the output material flow may be generated, respectively, so that the output material flow may for example be stored or intermediately stored, respectively, in a suitable container in compressed form at elevated pressure.

According to a further exemplary embodiment of the present invention, the supply system further comprises a gas-tight housing for all security relevant system components.

Thereby it may be avoided that exiting pollutants enter the passenger cabin of the aircraft.

According to a further exemplary embodiment of the present invention, the supply system further comprises a temperating device for adjusting a temperature within the gas-tight housing, and a pressure applying device for applying a pressure by means of an inert gas within the gas-tight housing, irrespective of the pressure outside the gas-tight housing.

Thereby, from the point of view of thermodynamics, the supply system is independent of the conditions within the airplane body. Both, temperature and pressure can be regulated independently within the gas-tight housing, to secure optimal process conditions.

BRIEF DESCRIPTION OF THE DRAWINGS

In the following, preferred embodiments of the present invention are described referring to the figures.

DETAILED DESCRIPTION

Figure 1:
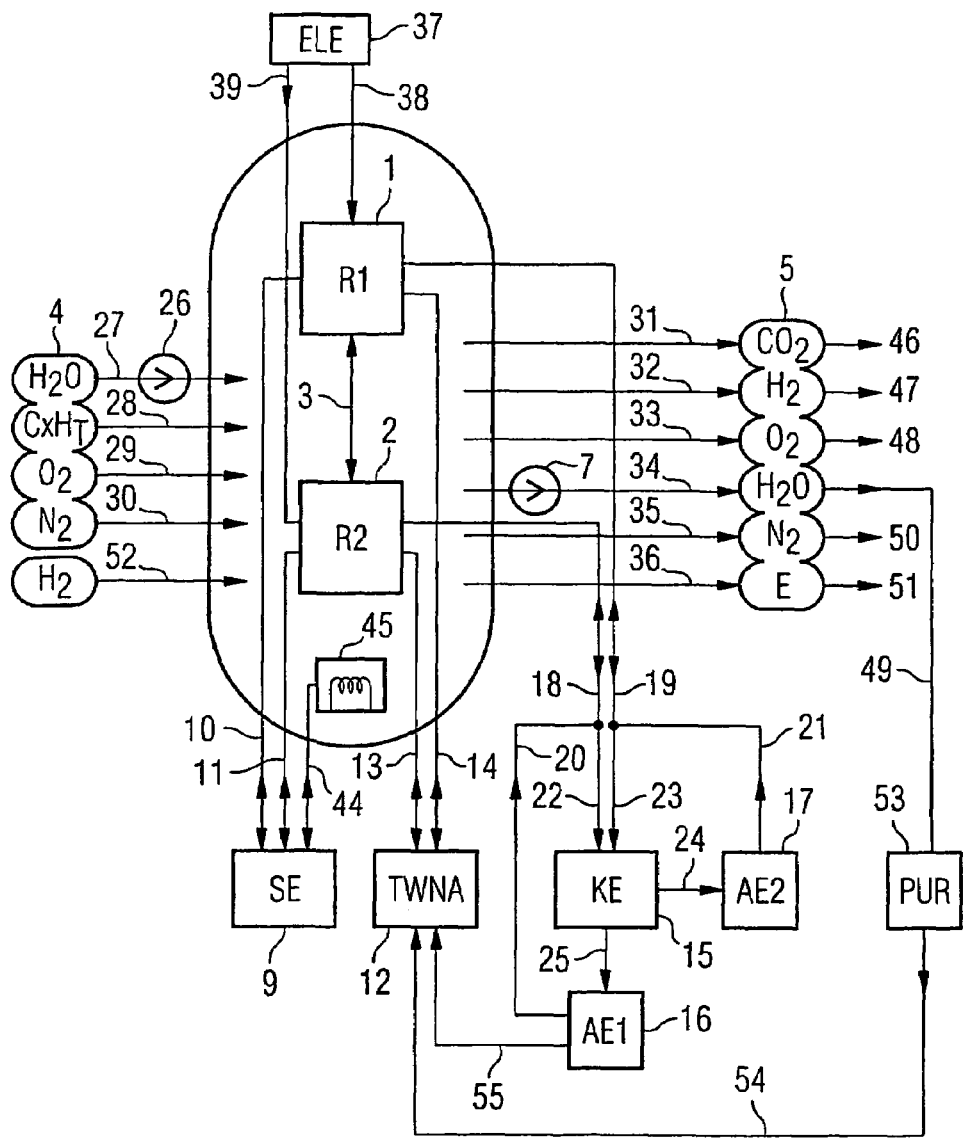
FIG. 1 shows a schematic representation of a supply system according to a preferred embodiment of the present invention.

FIG. 1 shows a supply system for an aircraft according to an exemplary embodiment of the present invention. By means of installing one or several electrochemical reactors, as for example a first electrochemical reactor 1 and a second electrochemical reactor 2 which, as input substances, use sufficiently cleared grey water, a hydrocarbon containing energy carrier as for example kerosene, as well as air-based oxygen to generate fresh water, oxygen as well as electric energy as output substances, a supply system for an aircraft having a modified system conception as compared to the supply systems known today may be provided.

Within the supply system shown in FIG. 1, several reactors of the same kind (here for example first reactor 1 and second reactor 2) may be installed, which combine systems for fresh water supply, energy generation and oxygen generation to a combined system which, up to now, have been provided separately. Thereby, the necessary redundancies may be secured by two or more systems or reactors of the same kind, which may be operated completely independently from each other.

The two electrochemical reactors thereby may replace completely or partly the following systems and components used today: power unit generators for generating electrical energy, auxiliary power units for generating pressurised air and electric energy, ram air turbines, fresh water tanks or oxygen supply systems.

Each electrochemical reactor may have the following mode of operation:

At one hand, cleaned grey water is split into hydrogen and oxygen. At the other hand, from a hydrocarbon energy carrier, as for example kerosene, hydrogen is generated. Furthermore, hydrogen and oxygen are synthesised to water to thereby generate electrical energy.

The following simplified reaction equation may hold true:

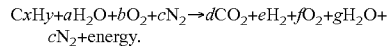

$$CxHy + aH_2O + bO_2 + cN_2 \rightarrow dCO_2 + eH_2 + fO_2 + gH_2O + cN_2 + \text{energy}.$$

Thereby, the following boundary conditions may be observed:

- the processes taking place in the reactor function as a combined process and are not to be operated separately from each other,
- the components of nitrogen, carbon dioxide and minor gases from the cabin's air are lead through the system and only play a minor role to the conversion process,
- the molecules and compounds at the input side are substantially not identical with the molecules and compounds at the output side,
- the material flows at the input side consist of cleared grey water, air (cabin air) and a hydrocarbon containing fuel (for example kerosene),
- the material flows at the output side consist of water, oxygen and carbon dioxide, in case of additionally externally connected fuel cells also hydrogen will be lead out,
- other gases emanating during the process are guided and converted internally in such a way that only the above given material flows are present outside the reactor,
- the reactor behaves thermally neutral with respect to its surrounding, so that a simple isolation may be sufficient to allow for an implementation into the flight structure,
- the electric energy output by the reactor, according to its origin, is a direct voltage.

In the following, the supply system according to an exemplary embodiment of the invention and the material flows in connection therewith are further described.

The supply system comprises of a first electrochemical reactor 1 and a second electrochemical reactor 2 which are connected to each other by means of a tubing system 3. By means of the tubing system 3, both, raw materials like for example oxygen, hydrogen and water, as well as heat energy or electrical energy may be exchanged. The principle components, or the components relevant to security, respectively, as for example the reactors 1 and 2, are disposed within a thermally isolated and gas-tight housing 6.

By means of conduit systems 27, 28, 29, 30 and 52, input substances 4 are provided to the electrochemical reactors 1, 2. The input substances 4 comprise grey water ($H_2O$), a hydrocarbon containing fuel (CxHy), air-based oxygen ($O_2$), air-based nitrogen ($N_2$) and hydrogen ($H_2$). The hydrogen at the input side stems for example from conduit systems having a hydrogen storage 47 which is fed by the supply system itself by means of a conduit system 32.

Starting from the electrochemical reactors 1,2, a system is obtained, which may be disposed in an aircraft as follows:

The waste water the arrangement 12, using potable water such as for example from the toilet, water tub, galleys or other water consumers, is transformed by means of cleaning and demineralisation into a water suitable for the reactor. This water is supplied to the first reactor 1 by means of a conduit system 14 or to the second reactor 2 by means of a conduit system 13. Within the reactor, the water is then split into the components hydrogen and oxygen. It is further possible, by means of the conduit systems 13, 14, to lead water output by one of the reactors 1,2 to the portable water using arrangement 12. Hereto, it may be necessary to interpose a condenser (15), so that the water is condensed out of its gaseous phase, and is separated from additional gaseous components which may be contained, as for example carbon dioxide, hydrogen or oxygen.

The oxygen generated in the reactors is lead via the conduit system 33 away from the reactors 1,2. The oxygen may thereafter be used for emergency supply to passengers in case of a pressure drop in the cabin, or, respectively, in normal operation, for example via conduit system 48, be supplied to an air conditioning system based on the principle of air regeneration (not shown in FIG. 1). Thereby, an oxygen storage may become obsolete. The emergency-case oxygen is quasi provided "online".

According to an exemplary embodiment of the present invention, it may further be thought of supplying the oxygen in a fuel cell process for improvement of performance to a fuel cell, or again to one of the reactors 1 or 2 via conduit system 29.

The hydrogen won from a water splitting process in the reactor internally, for example together with the hydrogen from a conditioning of hydrocarbons also present within the reactor (direct reforming process) may be lead to a further processing stage. Together with air-based oxygen, it is again converted to via conduit system 49 water here and is condensed out. This water may, for example, be lead exemplary to a following conditioning unit 53, and be freed of all unwanted ingredients there (purification). Thereafter, for example a conditioning to portable water is effected, for example in form of a mineralisation. This portable water is then lead to the above named water consumers of the portable water using arrangement 12 (for example wash-basins, toilet flushings and so on).

The water circuit is closed after the conditioning of the grey water and the leading back to the reactors.

Besides carbon dioxide ($CO_2$), hydrogen ($H_2$), oxygen ($O_2$), water ($H_2O$), nitrogen ($N_2$), energy is also considered as one of the output substances 5 generated in the reactor. At one hand, this energy is thermal energy which substantially does not leave the reactor, but is rather used to for example to vaporise water or kerosene. At the other hand, the electric energy generated in the reactor may for example be supplied to the board net of the aircraft, as is indicated by line system 51. It might as well be thought of intermediately store the electric energy generated by the reactor in respective accumulators to be used at a later point in time, for example for the starting process of the reactors.

To reach the redundancy necessary in an aircraft, in the exemplary embodiment according to FIG. 1, at least two reactors 1,2 working independently of each other are provided. In this context, all reactors together provide the necessary electric energy for peak work loads of the electric system, the necessary maximum amount of water and convert the maximally accumulating amount of grey water.

The oxygen portion necessary for generating air is supplied by one of the reactors alone. Excess amounts of oxygen are converted again in the reactors itself and supplement the oxygen portion of the supplied cabin air.

The reactors are designed and adapted such that one reactor alone is able to supply the necessary amount of oxygen for the emergency case for an unlimited time, for example when the cabin pressure drops on account of a leakage of the pressure cabin. This may be secured also under the conditions of reduced prior pressure of the available air upon this reactor in case of pressure drop.

The air's nitrogen guided through a reactor is led out via conduit systems 35, 50. In the same way, the carbon dioxide output by the reactor is led out via conduit systems 31,46.

In an exemplary embodiment of the present invention, a pump or turbine 7 is provided in conduit system 34, by means of which the water vapor led out from the reactor may be pumped off or compressed. Of course, such pumps or turbines may also be built into other conduit systems, as for example in conduit system 33, or as well in the water supplying conduit system 27 in form of pump or turbine 26.

According to a preferred exemplary embodiment of the present invention, there is provided a control unit 9 which controls or regulates the processes running in the reactor. For example, by means of control guiding systems 10 and 11, the two reactors 1 and 2 may be controlled/driven or regulated individually and independently of each other, so that the first and the second reactor may be operated independently of each other.

According to an exemplary embodiment of the present invention, it may be thought of providing a condenser unit 15 behind flour the first and second reactors 1,2 via conduit systems 19, 18, 23, 22 for condensing out water portions from an exhaust of the first reactor 1 or second reactor 2. The condensor unit 15 may for example be followed by a first conditioning unit 16 for processing the generated clear water to portable water and a second conditioning unit 17 for processing waste water to water usable for the supply of the first and second reactor 1,2. For this, a conduit systems 24, 25, may be provided. The portable water created in the conditioning unit 16 may be lead back to the reactor via conduit system 20 and conduit system 18, or may be supplied to the portable water using arrangement via conduit system 55. Further, the water created in conditioning unit 17 for supplying the first or second reactor via conduit system 21 and conduit system 19 may be lead back to the first reactor. Of course, according to the invention, it may be thought of a leading back to the second reactor here.

Further, an external electrical source of energy 37 may be provided, which, via line system 38, leads electrical energy to the first reactor 1, and which supplies electric current to the second reactor 2 via line system 39. In case of surpluses of electrical energy at another position, this electric energy may be used for supporting the reactors in splitting water, in order to increase their performance.

The hydrocarbon containing fuel $C_xH_y$ and the clear water to be possibly supplied externally, may be supplied to the reactors for example by means of respective supply arrangements (not shown in FIG. 1).

In case of a leakage of the tank system of the aircraft, in case of shortage of fuel or breakdown of a power unit, the reactors are adapted to provide sufficient by electric energy and oxygen until the landing. To this end, for example a hydride storage having a certain amount of stored hydrogen is provided. Alternatively to this, a solid state storage may be provided, the content of which frees hydrogen by means of supplying water. A suitable method consists in converting sodium boron hydride and water from the grey water region into sodium boric oxide and hydrogen. In this case, all electric consumers and the oxygen supply are decended to the minimal amount necessary for the sole need in case of emergency.

Figure 2:
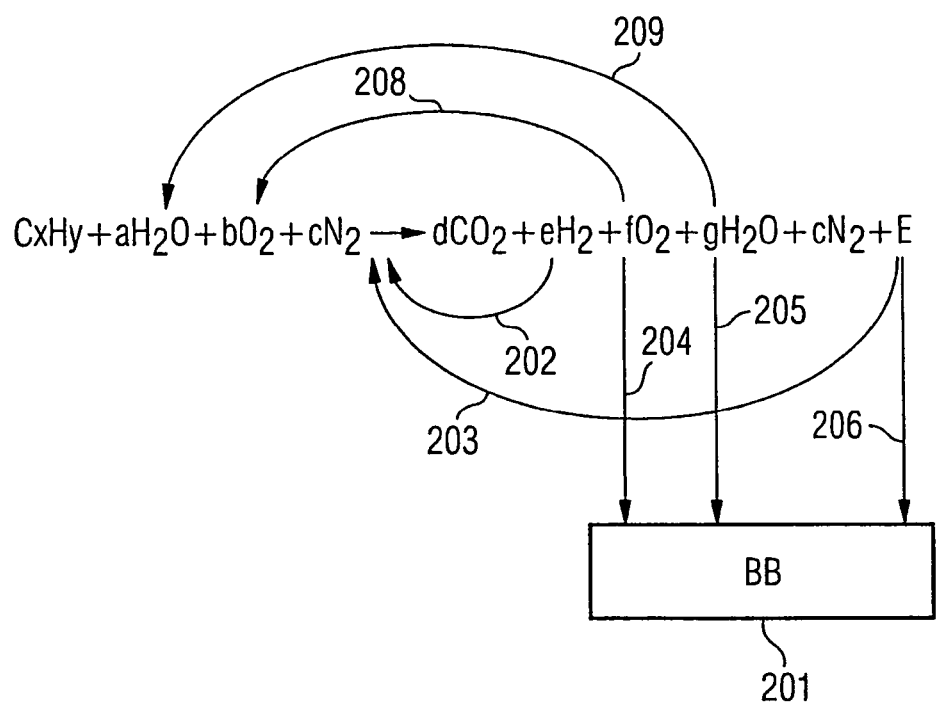
FIG. 2 shows the chemical or electrochemical processes running as a whole in the supply system and the use of the generated reaction products.

FIG. 2 shows the combined process of the electrochemical or chemical processes occurring in the supply system, and the respective use of the reaction products. In the electrochemical reactors 1,2, the hydrocarbon containing fuel CxHy, a parts of water, b parts of oxygen, c parts of nitrogen are converted to d parts of carbon dioxide, e parts of hydrogen, f parts of oxygen, g parts of clear water, c parts of nitrogen and energy.

The generated energy is electrical energy which may be used via lines 201 for the board operation 201, or otherwise may be lead to the electrochemical reactor via current guidance 203.

The water generated in the process, to the one hand may be lead to the process anew 209, or otherwise be used for the use in the board operation 205.

The oxygen created in the process is either used for the use in the board operation 204, or is supplied to a subsequently following combustion process or for example to a PEM fuel cell (not shown in FIG. 2). Further, the generated oxygen may serve to increase the conversion of one of the electrochemical reactors 1,2, as is symbolised by reference sign 208.

Further, the generated hydrogen may be used for increasing the conversion of the reactors, or may otherwise be lead to a subsequently following combustion process.

The application of the invention is not restricted to the exemplary embodiments shown in the figures, but a multitude of variations may be thought of, which make use of the shown solution and the principle according to the invention also in case of substantially differently formed embodiments.

In addition, it should be noted, that "comprising" does not exclude other elements or steps, and that "one" or "a" does not exclude a multitude. It should further be noted, that features or steps described with reference to one of the above embodiment examples may also be used in combination with other features or steps of other-embodiment examples described above.

The invention claimed is:

1. Aircraft, comprising:
a pressure cabin;
a supply system having a first electrochemical reactor for generating energy, hydrogen, oxygen and clear water from grey water, a fuel containing hydrocarbon and air;
wherein the first electrochemical reactor at least partly forms at least one of the aircraft's systems selected from the group consisting of an auxiliary power unit for generating pressurised air and electric energy, a ram air turbine, a clear water tank of a water system, a power unit generator for generating electric energy and an oxygen supply system;
wherein the supply system comprises a gas-tight housing for security critical system components;
wherein the supply system further comprises a pressure applying device for applying a pressure by means of an inert gas within the gas-tight housing, irrespective of the pressure outside the gas-tight housing; and
wherein the first electrochemical reactor alone supplies a necessary amount of oxygen for an emergency case when a cabin pressure drops on account of a leakage of the pressure cabin.

2. The aircraft of claim 1, further comprising:
a control unit for controlling or regulating processes occurring within the first electrochemical reactor; and
wherein chemical or electrochemical processes occuring within the first electrochemical reactor happen as a complete process, and are not separatable from one another.

3. The aircraft of claim 2,
wherein the supply system is adapted for controlling the processes such that the following reaction equation holds for the processes:

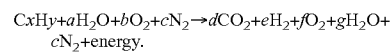

$$C_xH_y + aH_2O + bO_2 + cN_2 \rightarrow dCO_2 + eH_2 + fO_2 + gH_2O + cN_2 + \text{energy}.$$

4. The aircraft of claim 2, further comprising:
at least one second electrochemical reactor; and
wherein the control unit controls or regulates the first and the second electrochemical reactors individually, so that the first and the second electrochemical reactors may be operated independently of each other.

5. The aircraft of claim 4, further comprising:
at least one condenser unit; and
wherein the at least one condensor unit is adapted for condensing water portions out of an exhaust gas of at least on of the first and second electrochemical reactors and follows the at least one of the first and second electrochemical reactors.

6. The aircraft of claim 5, further comprising:
at least one first condition unit; and
at least one second condition unit;
wherein at least one condition unit of the at least one of a first conditioning unit which is adapted for conditioning the generated clear water to portable water and the at least one second conditioning unit which is adapted for conditioning waste water to water usable for supplying the at least one of first and second electrochemical reactors follows the at least one condensor unit.

7. The aircraft of claim 4,
wherein energy generated within at least one of the first and second electrochemical reactors is at least partly supplied as electric energy in form of non-alternating voltage to at least one of the first and second electrochemical reactors.

8. The aircraft of claim 4,
wherein the processes running in the at least one of first and second electrochemical reactors are controllable such that a combination of the first and second electrochemical reactors behaves thermally neutrally with respect to its surrounding, so that an isolation of the combination is sufficient for an implementation in the aircraft.

9. The aircraft of claim 4, further comprising:
at least one of at least one turbine and at least one pump; and
wherein the at least one of the at least one the turbine and pump is adapted to transport an output material flow exiting the at least one of the at least one first electrochemical reactor and the at least one second electrochemical reactor, or to pump an entrance material flow supplied to the at least one of the at least one first electrochemical reactor and the at least one second electrochemical reactor.

10. The aircraft of claim 4, further comprising:
a first hydrogen storage for providing hydrogen for the at least one of the at least one first electrochemical reactor and the at least one and second electrochemical reactor; and
a second hydrogen storage for storing of hydrogen generated the at least one of the at least one first electrochemical reactor and the at least one second electrochemical reactor.

11. The aircraft of claim 1, further comprising:

a portable water using arrangement, particularly at least one of a washing room installation, toilet flushing, excrements transport device and excrements collecting device; and wherein the portable water using arrangement has a collecting device for collecting accumulating waste waters.

12. The aircraft of claim 1, further comprising:

at least one supply device selected from the group consisting of:

a first supply device for the fuel containing hydrocarbon to be supplied;

a second supply device for clear water to be supplied externally; and a third supply device for electric energy to be supplied from at least one of a on-board electrical system, an external source of energy and a separately operated fuel cell.

13. The aircraft of claim 1, wherein the hydrocarbon containing fuel contains small portions of sulfur.

14. The aircraft of claim 1, further comprising:

a temperating device for adjusting a temperature within the gas-tight housing.

* * * * *

UNITED STATES PATENT AND TRADEMARK OFFICE
CERTIFICATE OF CORRECTION

PATENT NO. : 7,629,068 B2
APPLICATION NO. : 11/137231
DATED : December 8, 2009
INVENTOR(S) : Claus Hoffjann et al.

It is certified that error appears in the above-identified patent and that said Letters Patent is hereby corrected as shown below:

Title Page, Item (57), Line 7, Abstract after "may thereby" insert --be--
Col. 1, Line 40, after "provided" delete ","
Col. 1, Line 54, after "system itself)" insert --,--
Col. 2, Line 4, after "as" insert --a--
Col. 2, Line 10, after "way" delete ","
Col. 2, Line 22, replace "an" with --its--
Col. 2, Line 23, replace "are" with --is--
Col. 2, Line 36, insert -- - -- between "water using"
Col. 2, Line 39, insert -- - -- between "water using"
Col. 2, Line 53, delete "from" after "unit"
Col. 2, Lines 54-55, replace "exhausts of the reactors may removed these exhausts, which water may be" to --exhaust of the reactors may be removed which water may be--
Col. 2, Line 59, delete "," after "way"
Col. 2, Line 60, "reactor towards behaves" should read --reactors behave--
Col. 3, Line 38, delete "," after "Both"
Col. 4, Line 53, "comprises" should read --is comprised--
Col. 4, Line 56, delete "," after "both"
Col. 4, Line 56, delete "like" after "materials"
Col. 5, Line 4, delete "," after "obtained"
Col. 5, Line 5, delete "the" after "water"
Col. 5, Line 24, insert --and-- after "system 48,"
Col. 5, Line 34, delete "won" after "hydrogen"
Col. 5, Line 40, delete "to" after "converted"
Col. 5, Line 55, delete "to" after "example"
Col. 5, Line 59, "store" should be --storing--
Col. 6, Line 34, delete "flour" after "behind"
Col. 6, Line 41, after "For this," delete "a"
Col. 6, Line 45, insert -- - -- between "water using"
Col. 6, Line 49, delete "a" after "be thought of"

Signed and Sealed this
Eighteenth Day of January, 2011

David J. Kappos
*Director of the United States Patent and Trademark Office*

CERTIFICATE OF CORRECTION (continued)
U.S. Pat. No. 7,629,068 B2

Col. 6, Line 59, delete "," after "externally"
Col. 6, Line 64, delete "by" after "sufficient"
Col. 8, Line 24, replace "on" with --one--
Col. 8, Line 44, insert --the-- after "of"
Col. 8, Line 53, insert --of-- after "one"
Col. 8, Line 64, delete "and" after "one"
Col. 9, Line 4, insert -- - -- between "water using"
Col. 9, Line 45, insert -- - -- between "water using"
Col. 10, Line 6, replace "a" with --an--
Col. 10, Line 8, insert -- - -- after "hydrocarbon"